United States Patent [19]

D'orio et al.

[11] Patent Number: 5,790,624
[45] Date of Patent: Aug. 4, 1998

[54] MIXING VANE PROTECTING FLAP

[75] Inventors: J. Scott D'orio, Forest; Jeffrey S. Tucker, Lynchburg, both of Va.

[73] Assignee: Framatome Cogema Fuels, Lynchburg, Va.

[21] Appl. No.: 611,136

[22] Filed: Mar. 5, 1996

[51] Int. Cl.$^6$ ............................................. G21C 3/322
[52] U.S. Cl. ............................................. 376/439; 376/442
[58] Field of Search ............................ 376/438, 439, 376/441, 442, 443, 462

[56] References Cited

U.S. PATENT DOCUMENTS

| | | | |
|---|---|---|---|
| 3,862,000 | 1/1975 | Pugh et al. | 376/439 |
| 4,312,705 | 1/1982 | Steinke | 376/441 |
| 4,692,302 | 9/1987 | DeMario et al. | 376/439 |
| 5,327,472 | 7/1994 | Kraemer et al. | 376/439 |
| 5,339,341 | 8/1994 | King et al. | 376/439 |

*Primary Examiner*—Daniel D. Wasil
*Attorney, Agent, or Firm*—Pollock, Vande Sande & Priddy

[57] ABSTRACT

A protection flap provided on mixing vanes of structural or mid-span mixer grids in order to eliminate or substantially reduce fretting of fuel rods retained by such grids. The flap is an extension or addition of vane material bent upwardly so as to be substantially parallel to the longitudinal axis of the fuel rod being retained. The flap provides a smooth, vertical surface against which the fuel rod contacts in case of vibration, bowing or shifting.

5 Claims, 3 Drawing Sheets

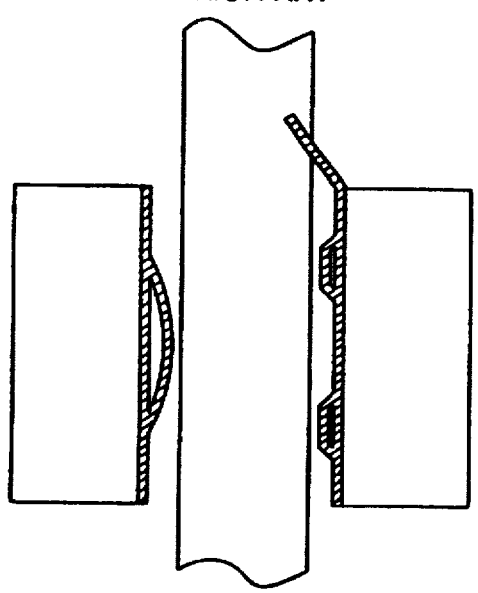
FIG. 4
PRIOR ART
FIG. 5
FIG. 6
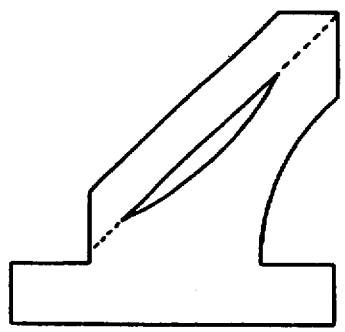
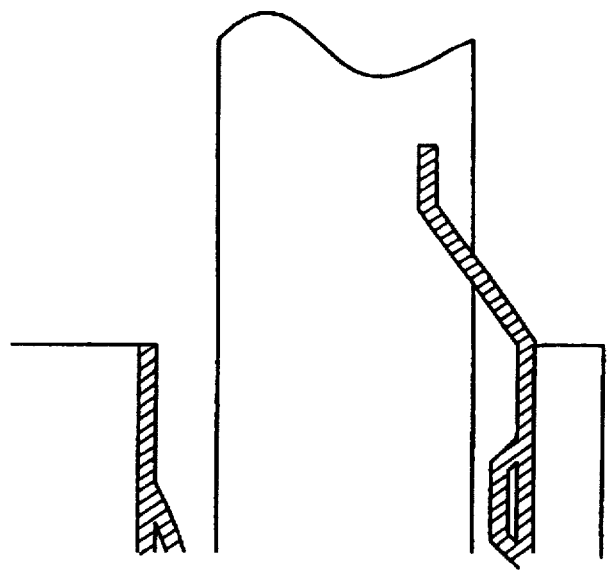

MIXING VANE PROTECTING FLAP

FIELD OF THE INVENTION

The present invention relates to an improvement in the configuration of spacer grid mixing vanes used in the mixing of coolant flow across fuel rods of a nuclear reactor fuel assembly.

BACKGROUND OF THE INVENTION

The vertically extending fuel rods of nuclear reactor fuel assemblies are normally supported by a series of spacer grids having an egg crate configuration, i.e., with cells through which the fuel rods are inserted. Parallel fuel rods extend through these cells, which are provided with vanes for deflecting a coolant fluid stream past the fuel assembly.

A typical mixing vane has sharp edges which can contact the fuel rod surface due to rod shifting, vibration, overbent vanes and the like. Such contact with the rods could cause fretting and consequent failure of the rods, and thus constitutes a major problem in the industry.

PRIOR ART

U.S. Pat. No. 5,327,472 to Kraemer et al. discloses a boiling water reactor including fuel assemblies having a case containing fuel rods which are parallel to walls of the case. Flow subchannels are formed by each four of the fuel rods. At least two and preferably four vanes in the flow subchannels are tapered in a vertical coolant flow direction and are three-dimensionally curved in such a way as to generate a swirl in the coolant flow. It is therefore possible to obtain a relatively high output from the fuel assembly.

U.S. Pat. No. 3,862,000 to Pugh et al. discloses mixing vanes so arranged on certain sections of nuclear reactor spacer grids as to provide a vortex flow of coolant about each intersection of the fuel assemblies in the reactor. This flow produces a mass transfer of coolant between adjacent assemblies and between regions within each assembly.

U.S. Pat. No. 5,339,341 to King et al. discloses a mixer grid for a nuclear reactor fuel assembly with a plurality of strips arranged in interlocking rows and columns defining a plurality of cells. A stopper is fixed to each corner of each cell for both directing coolant flow, providing coolant mixing and providing a smooth contact surface for the fuel rod. The stopper is either cone-shaped or cylindrical, and has a smooth, flat chamfered surface for contacting the fuel rod and minimizing damage upon shifting of the fuel rod. The grid is attached to the nuclear reactor fuel assembly by using guide cells comprising a plurality of support arches for welding to the nuclear reactor fuel assembly.

U.S. Pat. No. 4,692,302 to DeMario et al. discloses a grid structure for a nuclear reactor fuel assembly whose sole purpose is to promote a crossflow mixing of the coolant through the fuel assembly rather than the support of the fuel rods. The grid straps form an egg-crate configuration creating cell openings for receiving the fuel rods. Associated with each cell opening is at least one coolant flow mixing vane that projects over the cell opening and four dimple protrusions which are open to the flow of coolant therethrough. The dimple protrusions extend into the cell opening to a further extent than the mixing vane so as to prevent damaging impact of the fuel rod with a vane upon transverse movement of the fuel rod across the cell opening. In reducing the pressure drop of the coolant flow through the assembly, the height of the inner grid straps is substantially less than the height of the outer border strap.

SUMMARY OF THE INVENTION

The protection flap according to the present invention is an improvement to an existing spacer grid mixing vane, which is generally triangular in shape, with three straight edges and one curved edge. The vane is bent inwardly at an angle toward the fuel rod in order to divert coolant flow toward the heated fuel rod, placing the sharp edges of the vane in close proximity to the fuel rod, creating the risk that the edges will come into contact with the fuel rod as a result of fuel rod shifting, bowing, flow-induced vibration or overbent/damaged vanes.

Mixing vanes can be found on two types of grids, namely, structural and mid-span mixer grids. Structural grids have features, called softstops and hardstops, that position and stabilize the fuel rods within the cells, and hence decrease, but do not eliminate, the risk of fuel rod fretting. The protection flap according to the invention all but precludes any possibility of such fretting. However, it is even more useful on the other type of grids, i.e., mid-span mixer grids, which are typically non-contacting, and therefore provide no lateral support for the fuel rods. There is typically a gap between the fuel rod and the feature used to prevent contact which allows the rod more freedom to move toward contact. In this configuration, the protection flap of the invention provides a significant degree of protection from fuel rod fretting upon fuel rod/vane contact.

BRIEF DESCRIPTION OF THE DRAWINGS

In order that the invention may be more clearly understood, reference will now be made to the accompanying drawings, in which an embodiment of the invention is shown for purposes of illustration, and in which:

FIG. 4 is a side elevation view of a non-contacting mid-span mixer grid, similar to FIG. 2, in which the projections for preventing vane/fuel rod interference remain out of contact with the fuel rod;

FIG. 5 is a front view prior to bending showing a curved protection flap according to the invention;

FIG. 6 is a side view showing the mixing vane bent upwardly so as to form a protection flap with a flat vertical surface facing the fuel rod, in accordance with the present invention;

DETAILED DESCRIPTION

Figure 1:
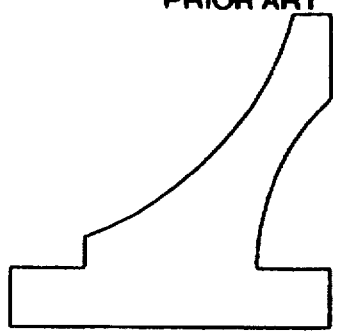
FIG. 1 is a front view prior to bending of a typical coolant flow mixing vane according to the prior art.
Figure 2:
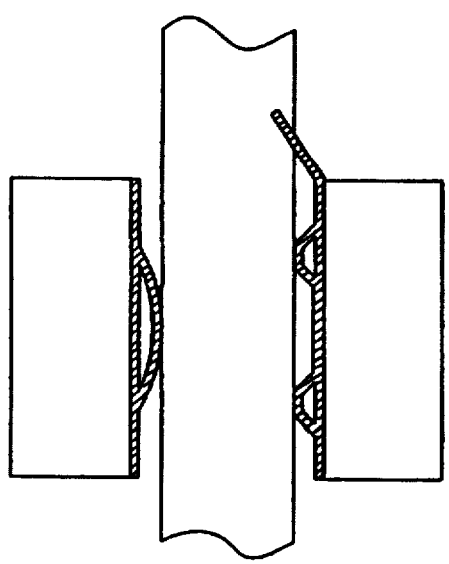
FIG. 2 is a side elevation view showing a prior art coolant flow mixing vane in combination with a fuel rod supported by a structural grid and contacted by softstop and hardstop projections.
Figure 3:
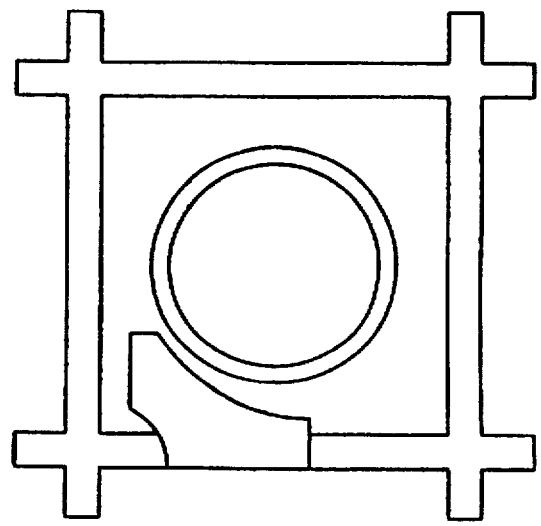
FIG. 3 is a top plan view showing the relationship between the fuel rod and mixing vane of a prior art structural grid.

The conventional mixing spacer grid mixing vane 1 shown in FIG. 1 is generally triangular in shape, with three straight edges 2, 3 and 4, and one curved edge 5. As shown in FIGS. 2 and 4, the vane is bent inwardly in order to divert coolant flow toward the heated fuel rod 6. As can be seen in FIG. 3, this places sharp curved edge 5 in close proximity to the fuel rod. Since, in the normal course of operation, the fuel rod tends to shift, bow or vibrate, there is a considerable risk that it will come into contact with sharp edge 5, and hence be subjected to fretting and, ultimately, to possible failure. Vanes overbent as a result of fuel rod reconstitution also increase the risk of fuel rod/vane contact.

This risk is particularly great in the case of the mixing vanes attached to non-contacting mid-span mixer grids 7, shown in FIG. 4, since their softstops 9 and hardstops 10 are normally out of contact with the fuel rod by design.

The structural grid 8, shown in FIG. 2, is provided with softstops 9 and hardstops 10, which position and stabilize fuel rod 6, and hence reduce the possibility of contact. However, even in the case of structural grids, the present invention is useful because it all but eliminates the risk of fretting if contact is made due to fuel rod bowing or vibration.

FIG. 6 is a side elevation view of the mixing vane 11 according to the invention. For clarity, softstops and hardstops have been omitted. It will be noted that, in this construction, the sharp edge of the vane is bent away from the fuel rod into a vertical position, so as to provide a protection flap 12 with a flat, smooth contact surface parallel to the longitudinal axis of the fuel rod. If the fuel rod shifts or vibrates and comes into contact with the flap, its large bearing area eliminates or substantially reduces the risk of rod failure due to fretting against the vane. The large bearing area 12 of the protection flap, compared to the sharp edge of a standard vane(s), substantially reduces the rate of material fretting, thereby delaying the unwanted condition beyond the design life of the rod.

Figure 7:
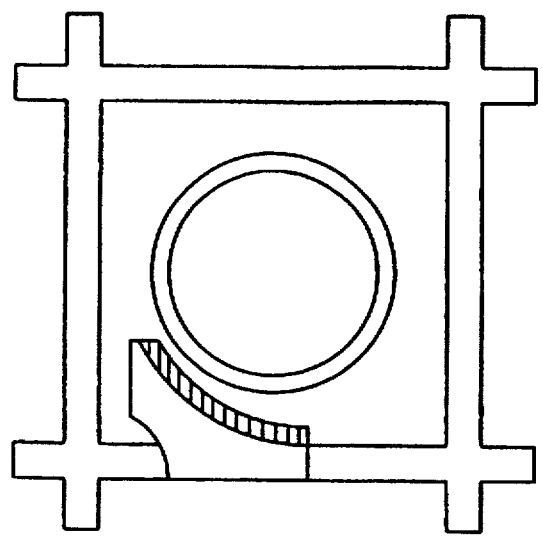
FIG. 7 is a top plan view showing a curved mixing vane after bending to form a protection flap in accordance with the invention.
Figure 8:
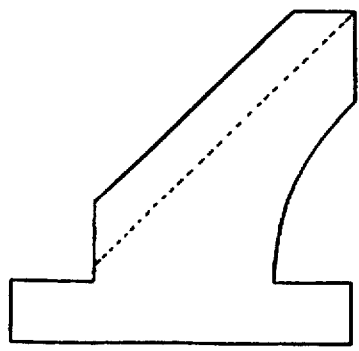
FIG. 8 is a front view prior to bending showing a straight protection flap according to the invention.
Figure 9:
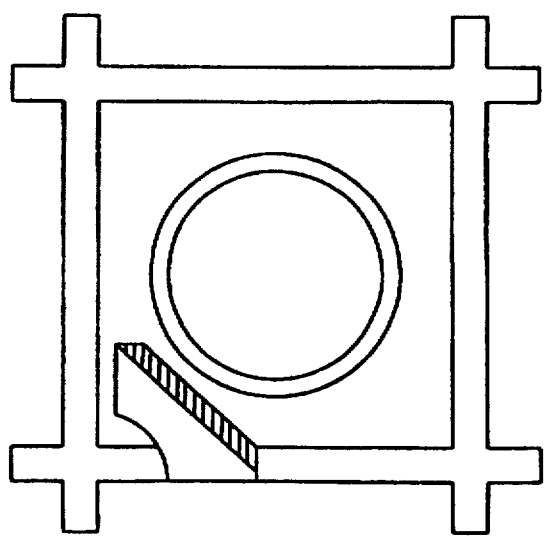
FIG. 9 is a top plan view showing a straight mixing vane after bending to form the protection flap according to the invention.

FIG. 7 shows a mixing vane design in which the conventional curved design of the vane is retained. This preserves the same mixing effect, but is more complicated to manufacture because of the additional cutting to form flap 12. An alternative design, shown in FIG. 9, changes the geometry of the vane by replacing the curved edge with a straight edge 13, thereby simplifying the manufacture of both the vane and the protection flap.

What is claimed is:

1. In a spacer grid for retaining fuel rods of a nuclear fuel assembly, a mixing vane extending from said spacer grid toward a said fuel rod in order to divert coolant flow thereto, said mixing vane comprising a vertical contact surface extending substantially parallel to a longitudinal axis of said fuel rod, said contact surface being constituted by a protection flap bent from said mixing vane into substantially vertical position.

2. The mixing vane according to claim 1, wherein said contact surface has a curvature generally congruous with a curvature of an outer periphery of said fuel rod.

3. The mixing vane according to claim 1, wherein said contact surface has a substantially straight edge.

4. The mixing vane according to claim 1, wherein said mixing vane projects from a structural spacer grid.

5. The mixing vane according to claim 1, wherein said mixing vane projects from a mid-span mixer grid.

* * * * *